US00RE35676E

United States Patent [19]

Wilcher

[11] E Patent Number: Re. 35,676

[45] Reissued Date of Patent: Dec. 2, 1997

[54] SLUDGE COLLECTOR FLIGHT

[75] Inventor: Stephen B. Wilcher, Harleysville, Pa.

[73] Assignee: FMC Corporation, Chicago, Ill.

[21] Appl. No.: 727,247

[22] Filed: Oct. 8, 1996

Related U.S. Patent Documents

Reissue of:

[64] Patent No.: 5,511,649
Issued: Apr. 30, 1996
Appl. No.: 283,499
Filed: Aug. 1, 1994

[51] Int. Cl.[6] ..... B65G 19/24

[52] U.S. Cl. ..... 198/731; 210/526

[58] Field of Search ..... 198/728, 731, 198/734; 210/526, 528; B65G 19/24

[56] References Cited

U.S. PATENT DOCUMENTS

| | | | |
|---|---|---|---|
| 3,008,565 | 11/1961 | Small | 198/731 X |
| 3,313,422 | 4/1967 | Swenson | 210/526 X |
| 3,394,816 | 7/1968 | Lowry | 210/526 |
| 4,585,116 | 4/1986 | Albrecht | 198/729 |
| 4,585,117 | 4/1986 | Harn | 198/731 |
| 4,645,598 | 2/1987 | Hannum | 210/526 X |
| 4,663,042 | 5/1987 | Rasper et al. | 210/525 |
| 5,250,178 | 10/1993 | Casper et al. | 210/526 X |
| 5,398,805 | 3/1995 | Esposito et al. | 198/734 X |

FOREIGN PATENT DOCUMENTS

| | | | |
|---|---|---|---|
| 2102756 | 2/1983 | United Kingdom | 198/731 |

*Primary Examiner*—James R. Bidwell
*Attorney, Agent, or Firm*—Michael C. Penn

[57] ABSTRACT

A sludge collector mechanism for scraping settled sludge off the bottom of a settling tank is disclosed wherein a sludge collector flight comprises a high strength "H"-shaped cross section and inwardly projecting lips for engaging the outwardly projecting clips of a wear shoe to thereby secure the wear shoe to the sludge collector flight.

9 Claims, 5 Drawing Sheets

SLUDGE COLLECTOR FLIGHT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to sludge collectors for removing sludge from rectangular settling tanks and, more particularly, to a sludge collector flight.

2. Description of Related Art

Sludge collectors are commonly used in waste water treatment plants to scrape the settled sludge from the bottom of the settling tank and also to skim floating waste off the surface of the waste water. These sludge collectors typically include a number of sludge flights, which are usually elongated members that extend the width of the tank. The ends of the flights are connected to conveyor chains, which carry the flights in a circuit lengthwise along the bottom of the tank and back over the surface of the water to perform the scraping and skimming functions. The ends of the flights are supported at the surface of the water by support rail assemblies, or tracks, which are fastened to the longitudinal sidewalls of the settling tank. The length of the flights between the chains is unsupported, and in typical settling tanks having widths of twenty feet or more, the flights are subjected to substantial bending forces from the scraping and skimming operations.

The settling tank itself is usually made of concrete and rails are embedded in the bottom of the settling tank to provide a track along which the flights are transported during the scraping operation. The portions of the flights which engage the rails during the scraping operation and also the portions of the rails that engage the support rail assemblies during the skimming operation are subject to wear. Therefore, wear shoes are typically attached to the flights at these portions to protect the flights. Prior art wear shoes are constructed of metal or plastic and are connected to the flights with several fasteners. However, the fasteners are subject to corrosion from exposure to the waste water, making removal of the wear shoes difficult. The fasteners must often be cut. This makes replacing the wear shoes timely and labor intensive.

SUMMARY OF THE INVENTION

Therefore, it is an object of the present invention to provide a high-strength flight that can withstand substantial bending forces. Another object of the invention is to provide a flight and wear shoe wherein the wear shoe can be easily connected to the flight without the use of fasteners.

According to the present invention, these and other objects and advantages are achieved by providing a flight having an "H"-shaped cross section and inwardly projecting lips on the top and bottom of each flight. The cross section of the flight has a high moment of inertia which enables the flight to withstand substantial bending forces. A wear shoe having a generally flat profile and including outwardly projecting lips is also provided. The wear shoe is connected to the flight by simply snapping the clips of the wear shoe over the lips of the flight. No fasteners are required. While the primary purpose of the wear shoe is to provide a wearing surface for the flight as the flight is transported along the bottom of the tank and the support rail assemblies, the wear shoe also provides additional support for the flight in the direction of travel. In another embodiment of the invention, a flight extension plate having an elongated blade attached to a base comprising two outwardly projecting clips is provided. The extension plate attaches to the flight in a manner similar to the wear shoe. The extension plate allows the flights to operate effectively in deep sludge applications.

These and other objects and advantages of the present invention will be made apparent from the following detailed description, with reference to the accompanying drawings.

DETAILED DESCRIPTION OF THE PREFERRED EMBODIMENTS

Figure 1:
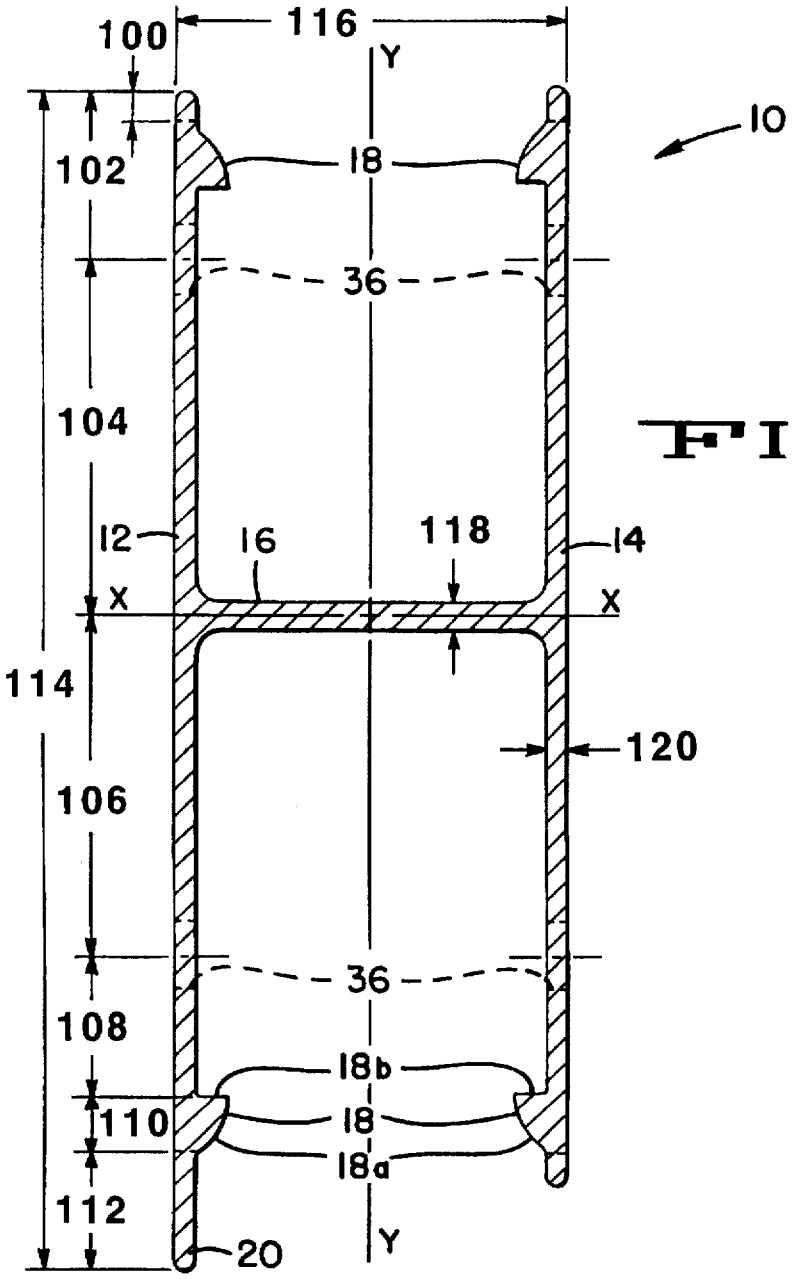
FIG. 1 is a cross-section view of the flight of the present invention.
Figure 1A:
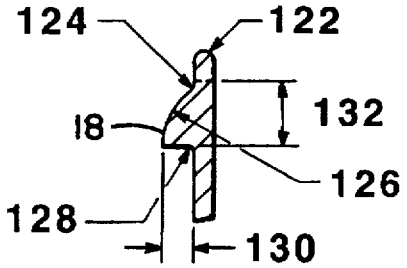
FIG. 1A is an enlarged view of a portion of the flight depicted in FIG. 1.

Referring to FIGS. 1 and 1A, the sludge collector flight of the present invention, indicated generally by reference number 10, is shown to comprise an "H"-shaped cross section having a substantially flat front or sludge contacting face 12 and a substantially flat rear face 14 connected by a transverse arm 16. Flight 10 also comprises lips 18 projecting inwardly from near the top and bottom of front and rear faces 12, 14. Each lip includes an outwardly presenting, arcuate cam surface 18a and an inwardly presenting, transverse engaging surface 18b. In addition, flight 10 includes a finger 20 extending longitudinally from the bottom of front face 12. As will become more apparent later, finger 20 extends to the same level as the wear shoes to provide for effective engagement of flight 10 with the bottom of the settling tank. As flight 10 is transported by the chains (not shown) along the bottom of the tank, front face 12 and finger 20 scrape the sludge from the bottom of the settling tank with minimal floor clearance. As flight 10 is transported back over the waste water along the support rail assemblies (not shown), front face 12 skims the floating waste from the top of the waste water.

The length of flight 10 depends upon the width of the settling tank in which it is employed. Lengths of twenty feet or more are not uncommon. The "H"-shaped cross section comprises a relatively high moment of inertia in the direction of travel (the Y direction), and flight 10 is therefore able to withstand the substantial bending forces caused by scraping and skimming the sludge. In a preferred embodiment of the invention, the cross section has the dimensions indicated in [FIGS. 1 and 1 A] *the example below*, with an area of 2.46023 $in^2$ and a moment of inertia in the Y direction ($I_{y-y}$) of 2.98317. Flight 10 is also preferably a pultrusion fabricated out of isopthalic polyester reinforced with 55% glass fiber by weight having the following properties: a longitudinal tensile strength of 47,500 psi, a transverse tensile strength of 7,000 psi, and a modulus of elasticity of $4.8\times10^6$ psi. However, the present invention should also be considered to cover other generally "H"-shaped cross sections having different dimensions and moments of inertia, as well as flights constructed of other materials, including metallic materials.

Figure 2:
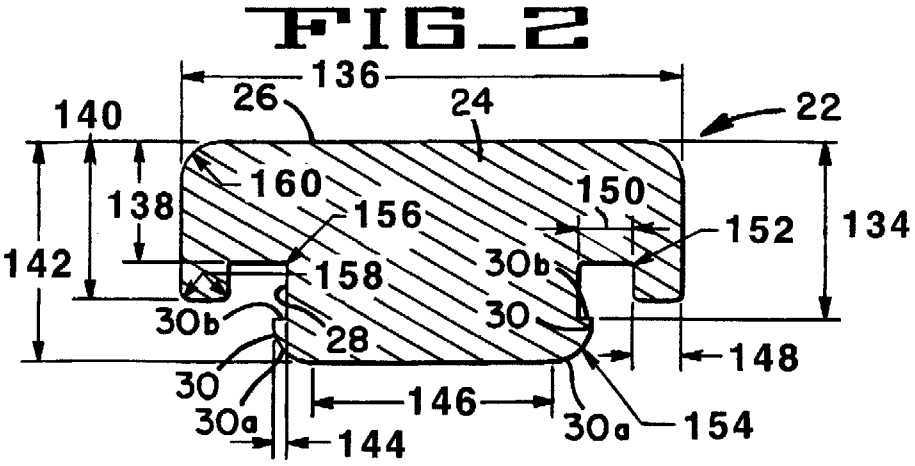
FIG. 2 is a cross-section view of the wear shoe of the present invention.

Referring to FIG. 2, a wear shoe 22 is shown (in an upside down orientation) to comprise a base 24 having a substantially flat wearing surface 26 and a stem 28 extending transversely from base 24. Wear shoe 22 also comprises a clip 30 extending outwardly from each side of stem 28. Each clip includes an outwardly presenting, arcuate cam surface 30a and an inwardly presenting, transverse engaging surface 30b. Wear shoe 22 comprises a length sufficient to provide an acceptable wearing surface for flight 10, and a wear shoe connected to the bottom of flight 10 for engaging the rails of the settling tank may have a width different from that of a wear shoe connected to the top of flight 10 for engaging the support rail assembly. In addition, the height, or thickness, of a wear shoe 22 can vary depending upon the particular application in which it is used. Wear shoe 22 is preferably molded as a single unit from a non-metallic material, such as polyurethane or UHMW. However, wear shoe 22 may also be machined or cast from a metallic material, especially when used in conjunction with a metallic flight.

Figure 3:
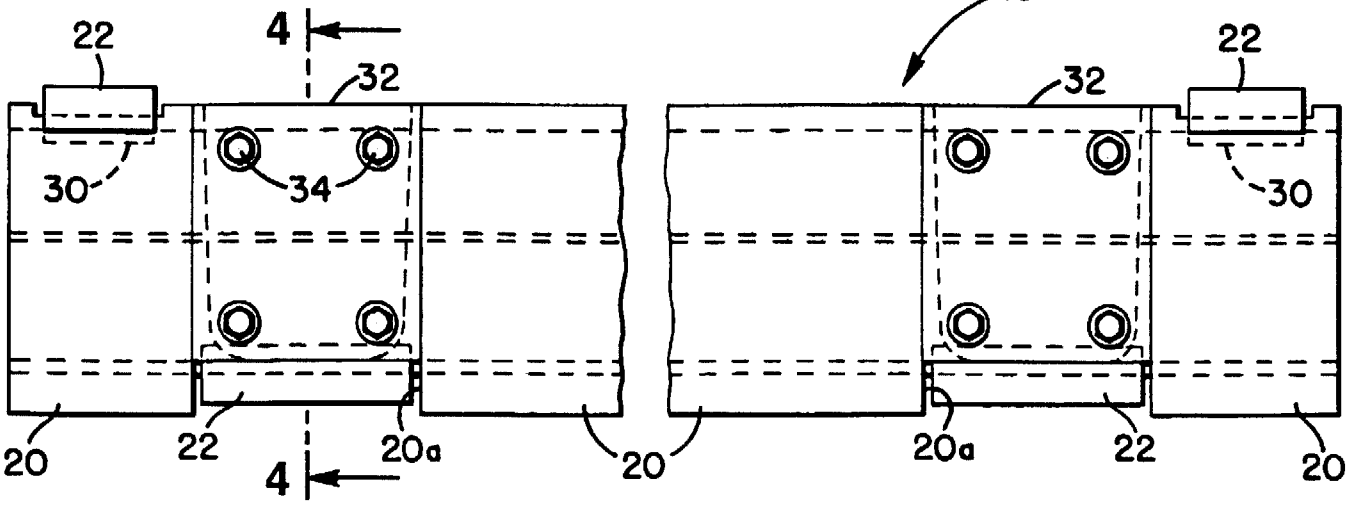
FIG. 3 is a front elevation view of the flight with several wear shoes attached thereto.
Figure 4:
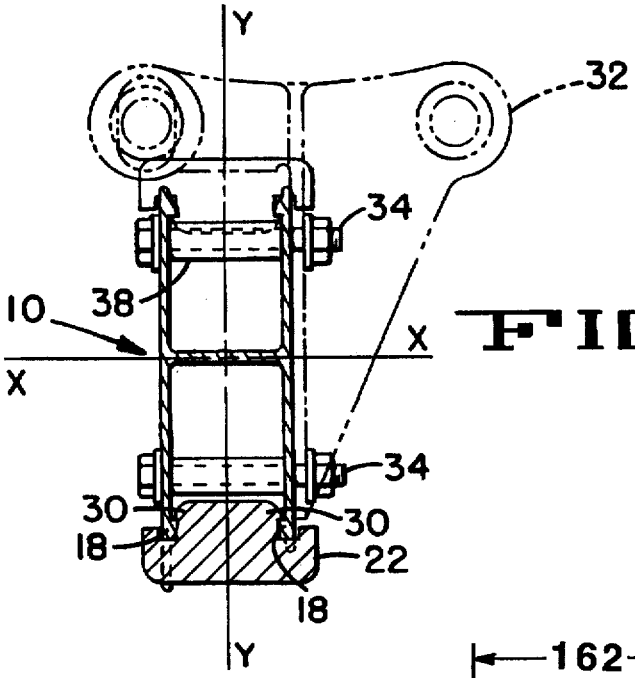
FIG. 4 is a cross-section view of the flight taken along line [A—A] *4—4* of FIG. 3.

Referring now to FIGS. 3 and 4, wear shoe 22 is connected to the top or bottom of flight 10 by snapping clips 30 over lips 18. Cam surfaces 30a of wear shoe 22 engage cam surfaces 18a of flight 10 and bend the ends of front and rear faces 12, 14 slightly outwardly, while at the same time being compresses slightly, until clips 30 are inserted past lips 18, whereupon the ends of front and rear faces 12, 14 return to their original position to firmly lock engaging surfaces 30b and 18b together and thereby secure wear shoe 22 to flight 10. A chain connecting link 32 connects each flight 10 to the drive chains near each end of the flight (not shown), and a wear shoe 22 is preferably connected to the bottom of flight 10 proximate each chain connecting link 32, or wherever a particular application requires, for engaging the rails at the bottom of the settling tank. In addition, a wear shoe 22 is preferably connected to the top of flight 10 outboard of each chain connecting link 32 for engaging the support rail assemblies mounted to the sides of the settling tank. As is apparent from FIG. 3, finger 20 is provided with cutouts 20a to accommodate wear shoes 22. In addition, the height of each wear shoe 22 connected to the bottom of flight 10 is preferably the same as the length of finger 20. However, in some applications, such as where the rails on the floor of the settling tank are very thick, the height of wear shoe 22 is less than the length of finger 20 so that finger 20 will extend substantially to the bottom of the settling tank.

Figure 5:
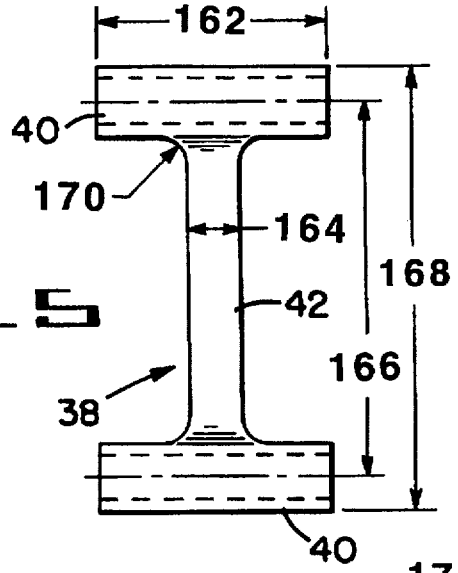
FIG. 5 is a front elevation view of the spacer bar element of the invention.
Figure 6:
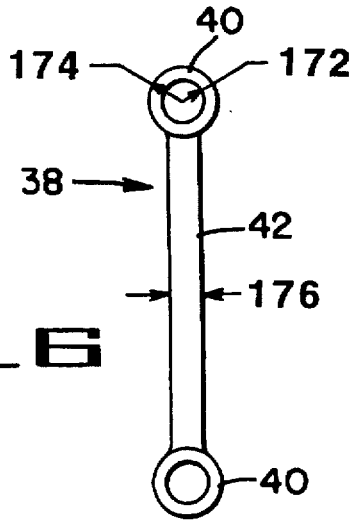
FIG. 6 is a side elevation view of the spacer bar depicted in FIG. 5.
Figure 7:
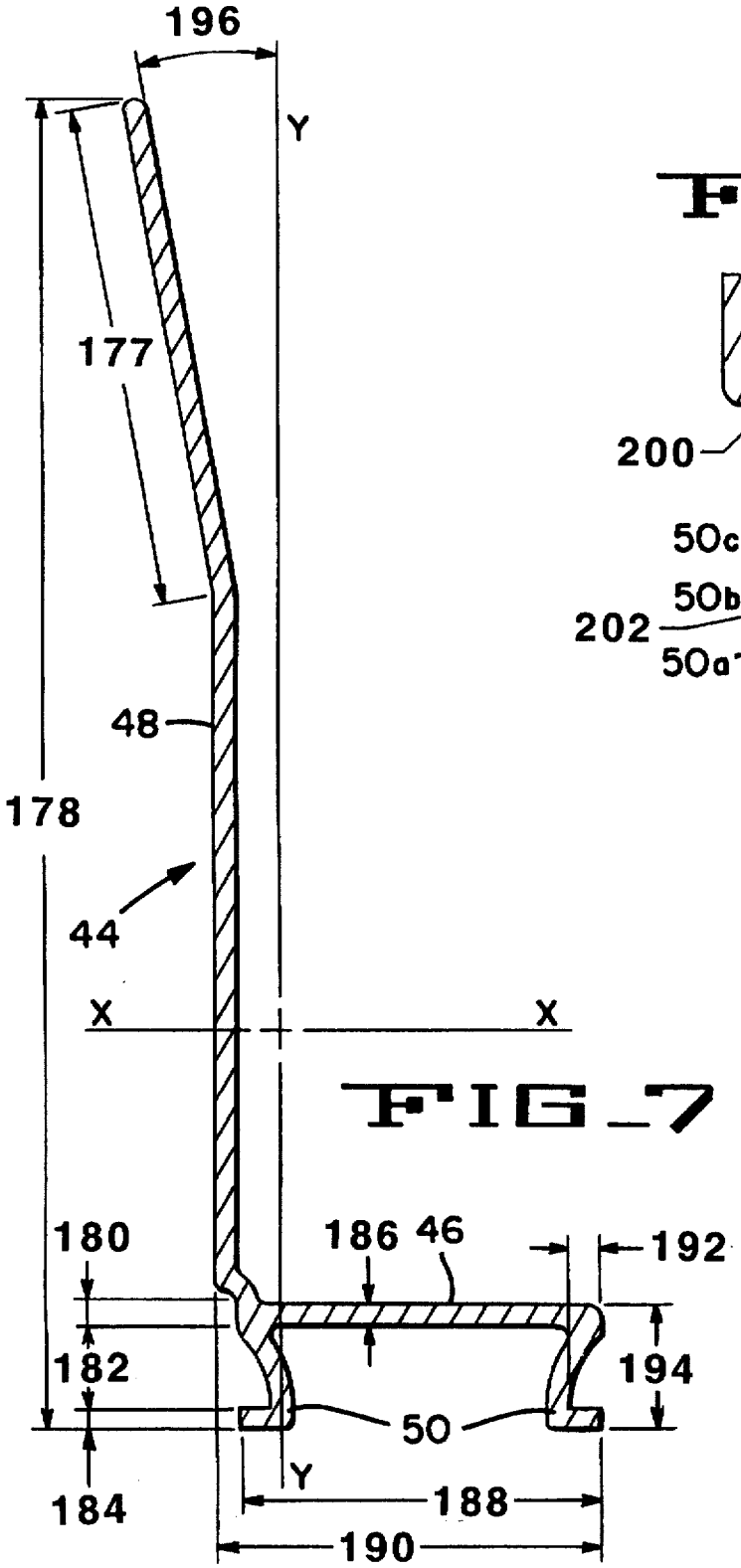
FIG. 7 is a cross-section view of the flight extension plate according to the present invention.
Figure 8:
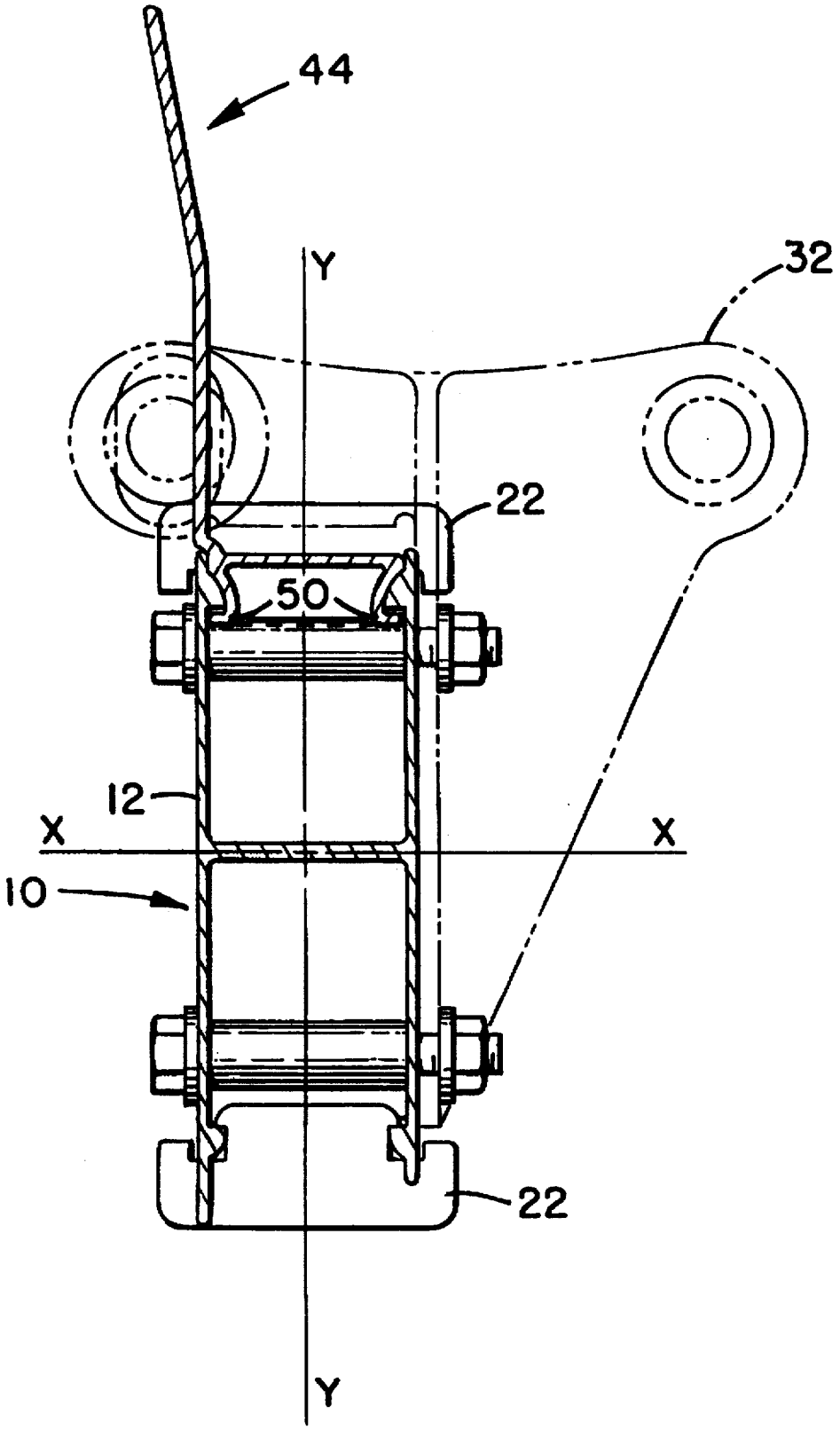
FIG. 8 is a cross-section view of a flight connected with the flight extension plate.

Flights 10 are connected to chain connecting links 32 with bolts or any other suitable fasteners 34. Bolts 34 extend through holes 36 in flight 10 (FIG. 1) and through corresponding holes in chain connecting links 32. To provide lateral support to front and rear faces 12, 14 proximate holes 36, spacer bars 38 may be employed. Referring to FIGS. 5 and 6, each spacer bar 38 comprises two cylindrical sections 40 connected by a transverse stem 42. The spacing between the centerlines of cylindrical sections 40 corresponds to the distance between adjacent holes 36. Referring to FIG. 4, a spacer bar 38 is inserted between the upper portions of front and rear faces 12, 14 with cylindrical sections 40 in alignment with holes 36. Another spacer bar 38 is similarly inserted between the lower portions of front and rear faces 12, 14. Bolts 34 are then inserted through chain connecting link 32, holes 36 and cylindrical section 40 to thereby connect flight 10 to chain connecting link 32. Spacer bars 38 are preferably constructed of a non-metallic material.

in another embodiment of the invention, a flight extension plate 44 may be employed in conjunction with flight 10 to effectively handle deep sludge layer applications. Referring to FIG. 7, flight extension plate 44 is shown to comprise a substantially flat base 46, an elongated blade 48 extending transversely from one side of the base, and two clips 50 extending from the opposite side of the base. Each clip 50 includes an outwardly presenting, generally flat cam surface 50a, a transverse engaging surface 50b and an outwardly presenting, arcuate locking surface 50c. Referring to FIG. 8, flight extension plate is connected to the top of flight 10 by sliding clips 50 over lips 18 from an end of flight 10 so that each lip 18 is firmly locked between engaging surface 50b and locking surface 50c to thereby secure flight extension plate 44 to flight 10. The length of flight extension plate 44 is preferably chosen to correspond to the distance between chain connecting links 32, and flight extension plate 44 is accordingly positioned on flight 10 between chain connecting links 32 with blade 48 extending from forward face 12. The height of blade 48 is chosen depending on the application in which flight 10 is intended to be used. For example, blade 48 could be eight inches or more in height, thereby creating a flight with an effective depth of fifteen inches. In addition, the free end of blade 48 may be angled slightly forwardly to more effectively convey the layer of sludge. Flight extension plate 44 can be constructed of either a metallic or a non-metallic material in a manner similar to flight 1 0, and can be cut to suit different applications, depths and mechanical equipment combinations.

*The dimensions of the sludge collector flight 10 shown in FIGS. 1 and 1A may be as follows:*

| *Reference No.* | *Dimension (inches)* |
|---|---|
| *100* | *0.25* |
| *102* | *1.125* |
| *104* | *2.25* |
| *106* | *2.25* |
| *108* | *0.875* |
| *110* | *0.375* |
| *112* | *0.75* |
| *114* | *7.625* |
| *116* | *2.5* |
| *118* | *0.1875* |
| *120* | *0.125* |
| *122* | *0.0625 (radius of curvature)* |
| *124* | *0.09375 (radius of curvature)* |
| *126* | *0.5 (radius of curvature)* |
| *128* | *0.03125 (radius of curvature)* |
| *130* | *0.1875* |
| *132* | *0.375* |

*Further, the section properties with respect to axes through the centroid for the sludge collector flight 10 shown in FIGS. 1 and 1A may be as follows:*

*Area=2.46023*
*XBAR=1.19368*
*YBAR=4.22583*
*I X-X=10.2968*
*I Y-Y=2.98317*
*I X-Y=0.522897*
*R X-X=2.04580*

*R Y-Y=1.10116*
*ZETA=–4.06886*
*IP X-X=10.3340*
*IP Y-Y=2.94598*
*RP X-X=2.04949*
*RP Y-Y=1.09428*

*The dimensions of the wear shoe 22 shown in FIG. 2 may be as follows;*

| Reference No. | Dimension (inches) |
|---|---|
| 134 | 1.125 |
| 136 | 3.25 |
| 138 | 0.75 |
| 140 | 1.0 |
| 142 | 1.375 |
| 144 | 0.09375 |
| 146 | 1.5625 |
| 148 | 0.3125 |
| 150 | 0.375 |
| 152 | 0.03125 (radius of curvature) |
| 154 | 0.25 (radius of curvature) |
| 156 | 0.03125 (radius of curvature) |
| 158 | 0.0625 (radius of curvature) |
| 160 | 0.25 (radius of curvature) |

*The dimensions of the spacer bar 38 shown in FIGS. 5 and 6 may be as follows:*

| Reference No. | Dimension (inches) |
|---|---|
| 162 | 2.25 |
| 164 | 0.5 |
| 166 | 3.75 |
| 168 | 4.4375 |
| 170 | 0.25 (radius of curvature) |
| 172 | 0.21875 (radius of curvature) |
| 174 | 0.34375 (radius of curvature) |
| 176 | 0.3125 |

Figure 7A:
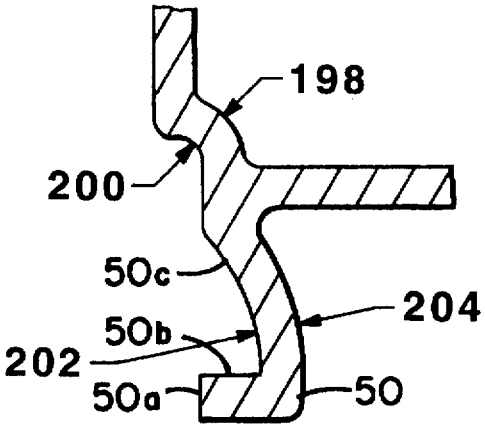
FIG. 7A is an enlarged view of a portion of the flight extension plate depicted in FIG. 7.

*The dimensions of the flight extension plate 44 shown in FIGS. 7 and 7A may be as follows:*

| Reference No. | Dimension (inches) |
|---|---|
| 177 | 3.0 |
| 178 | 8.125 |
| 180 | 0.1875 |
| 182 | 0.4375 |
| 184 | 0.125 |
| 186 | 0.125 |
| 188 | 2.1875 |
| 190 | 2.375 |
| 192 | 0.1875 |
| 194 | 0.75 |
| 198 | 0.21875 (radius of curvature) |
| 200 | 0.09375 (radius of curvature) |
| 202 | 0.53125 (radius of curvature) |
| 204 | 0.65625 (radius of curvature) |

*Angle 196 may be ten deqrees. Further, the section properties with respect to axes through the centroid for the flight extension plate 44 shown in FIGS. 7 and 7A may be as follows:*

*Area=1.43252*
*XBAR=0.251456*
*YBAR=3.05533*
*I X-X=9.26465*
*I Y-Y=0.863585*
*I X-Y=–1.90049*
*R X-X=2.54310*
*R Y-Y=0.776430*
*ZETA=12.1720*
*IP X-X=9.67458*
*IP Y-Y=0.453658*
*RP X-X=2.59876*
*RP Y-Y=0.562748*

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A sludge collector mechanism for scraping settled sludge off the bottom of a settling tank, the sludge collector mechanism including a sludge collector flight comprising:

an "H"-shaped cross section having a substantially flat front face, a substantially flat rear face and a transverse stem joining the front and rear faces;

a first lip extending transversely from proximate an end of the front face; and a second lip extending transversely from proximate a corresponding end of the rear face.

wherein said "H" shape comprises an open-ended region between said first and second lips.

2. The sludge collector mechanism of claim 1 further comprising a wear shoe having two clips for engaging the first and second lips, whereby the wear shoe is connected to the sludge collector flight through engagement of the clips with the first and second lips.

3. The sludge collector mechanism of claim 2, wherein the first and second lips extend inwardly toward each other from proximate the ends of the respective front and rear faces and the clips each extend outwardly.

4. The sludge collector mechanism of claim 1, wherein the sludge collector flight further comprises a finger extending longitudinally downwardly from the front face an amount substantially equal to the depth of the wear shoe.

5. The sludge collector mechanism of claim 1 further comprising a flight extension plate having a base, an elongated blade extending generally transversely from one side of the base, and two clips extending transversely from the other side of the base for engaging the first and second lips, whereby the flight extension plate is connected to the sludge collector flight through engagement of the clips with the first and second lips.

6. The sludge collector mechanism of claim 1, wherein the sludge collector flight is constructed of a non-metallic material.

7. A sludge collector mechanism for scraping settled sludge off the bottom of a settling tank, the sludge collector mechanism comprising:

a sludge collector flight which comprises an "H"-shaped cross section having a substantially flat front face, a substantially flat rear face, a first lip extending transversely from proximate an end of the front face toward the rear face, and a second lip extending transversely from proximate a corresponding end of the rear face toward the front face;

a wear shoe which comprises a base having a substantially flat wearing surface, a stem extending transversely from the base, a first clip extending transversely outwardly from a first side of the stem, and a second clip extending transversely outwardly from a second side of the stem;

wherein the first and second clips are engageable with the first and second lips to thereby secure the wear shoe to the sludge collector flight.

8. The sludge collector mechanism of claim 7 further comprising an elongated flight extension plate having a base, a blade extending generally transversely from the base, and two outwardly presenting clips extending from the base opposite the blade;

wherein the clips are engageable with the first and second lips to thereby secure the flight extension plate to the sludge collector flight.

9. The sludge collector mechanism of claim 7, wherein the sludge collector flight is constructed of a non-metallic material.

* * * * *